(12) United States Patent
Singh et al.

(10) Patent No.: US 9,350,464 B2
(45) Date of Patent: *May 24, 2016

(54) METHOD AND SYSTEM FOR MITIGATING CO-CHANNEL INTERFERENCE

(71) Applicant: Telcom Ventures, LLC, Alexandria, VA (US)

(72) Inventors: Rajendra Singh, Alexandria, VA (US); George Olexa, Gainesville, GA (US)

(73) Assignee: TELCOM VENTURES, LLC, Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,560

(22) Filed: Feb. 14, 2013

(65) Prior Publication Data

US 2013/0225155 A1  Aug. 29, 2013

Related U.S. Application Data

(60) Division of application No. 12/508,942, filed on Jul. 24, 2009, now Pat. No. 8,406,701, which is a continuation of application No. 11/262,975, filed on Nov. 1, 2005, now Pat. No. 7,583,935.

(60) Provisional application No. 60/697,367, filed on Jul. 8, 2005.

(51) Int. Cl.
*H04B 15/00* (2006.01)
*H04B 7/185* (2006.01)
(Continued)

(52) U.S. Cl.
CPC ............ *H04B 15/00* (2013.01); *H04B 7/18515* (2013.01); *H04W 16/04* (2013.01); *H04W 16/12* (2013.01)

(58) Field of Classification Search
CPC ...... H04B 1/406; H04B 7/2693; H04B 72/10; H04B 7/18515; H04B 15/00; H04W 48/08; H04W 84/08
USPC .......................... 455/73, 422.1, 502; 370/341
See application file for complete search history.

(56) References Cited

U.S. PATENT DOCUMENTS 3,742,498 A  6/1973  Dunn
4,599,647 A  7/1986  George et al.
(Continued)

FOREIGN PATENT DOCUMENTS

EP  1608085  12/2005
JP  10-075263  3/1998
(Continued)

OTHER PUBLICATIONS

International Search Report Issued in related International Application No. PCT/US06/62566, mailed Sep. 26, 2007.
(Continued)

*Primary Examiner* — Phuoc H Doan
(74) *Attorney, Agent, or Firm* — DLA Piper LLP US

(57) ABSTRACT

A method of communicating data between a first transceiver and any of a plurality of second transceivers, wherein areas serviced by each of the plurality of second transceivers either overlap or are adjacent. The method comprises operating the first transceiver and the plurality of second transceivers in an overlapping frequency range. Each of the plurality of second transceivers operates in a time period different from a time period of another of the plurality of second transceivers.

21 Claims, 10 Drawing Sheets

(51) Int. Cl.
*H04W 16/04* (2009.01)
*H04W 16/12* (2009.01)

(56) References Cited

U.S. PATENT DOCUMENTS

| | | | |
|---|---|---|---|
| 5,388,101 A | 2/1995 | Dinkins | |
| 5,444,697 A | 8/1995 | Leung et al. | |
| 5,535,432 A | 7/1996 | Dent | |
| 5,584,046 A * | 12/1996 | Martinez et al. | 455/13.1 |
| 5,713,075 A | 1/1998 | Threadgill | |
| 5,717,830 A | 2/1998 | Sigler | |
| 5,842,125 A | 11/1998 | Modzelesky | |
| 5,850,415 A | 12/1998 | Hunsinger | |
| 5,864,579 A | 1/1999 | Briskman | |
| 5,913,164 A | 6/1999 | Pawa | |
| 6,014,548 A | 1/2000 | Balachandran | |
| 6,112,083 A | 8/2000 | Sweet | |
| 6,188,873 B1 | 2/2001 | Wickman | |
| 6,301,313 B1 | 10/2001 | Gevargiz | |
| 6,477,370 B1 | 11/2002 | Sigler | |
| 6,522,644 B2 | 2/2003 | Bergkvist | |
| 6,539,004 B1 | 3/2003 | Sawyer | |
| 6,757,546 B1 | 6/2004 | Hagen | |
| 6,823,169 B2 | 11/2004 | Marko | |
| 6,892,068 B2 | 5/2005 | Karabinis et al. | |
| 7,113,778 B2 | 9/2006 | Karabinis | |
| 7,149,526 B2 | 12/2006 | Karabinis et al. | |
| 7,286,624 B2 | 10/2007 | Woo | |
| 7,813,700 B2 | 10/2010 | Zheng | |
| 8,131,403 B2 | 3/2012 | Forbes | |
| 8,374,601 B2 | 2/2013 | Sadok | |
| 2001/0038674 A1 | 11/2001 | Trans | |
| 2002/0012381 A1 | 1/2002 | Mattisson et al. | |
| 2002/0177465 A1 | 11/2002 | Robinett | |
| 2004/0072539 A1 | 4/2004 | Monte et al. | |
| 2004/0192201 A1 | 9/2004 | Febvre | |
| 2004/0198312 A1 | 10/2004 | Jarett | |
| 2005/0031045 A1 | 2/2005 | Mayor et al. | |
| 2005/0164701 A1 | 7/2005 | Karabinis et al. | |
| 2005/0176379 A1 | 8/2005 | Grindahl et al. | |
| 2006/0111041 A1 | 5/2006 | Karabinis | |
| 2006/0135058 A1 | 6/2006 | Karabinis | |
| 2006/0135070 A1 | 6/2006 | Karabinis | |
| 2006/0205367 A1 | 9/2006 | Karabinis | |
| 2006/0281476 A1 * | 12/2006 | Lane et al. | 455/502 |
| 2007/0037514 A1 | 2/2007 | Karabinis | |
| 2008/0214207 A1 | 9/2008 | Karabinis | |
| 2008/0242330 A1 | 10/2008 | Singh | |
| 2010/0041394 A1 | 2/2010 | Karabinis | |
| 2010/0041395 A1 | 2/2010 | Karabinis | |
| 2013/0229978 A1 * | 9/2013 | Battista et al. | 370/319 |

FOREIGN PATENT DOCUMENTS

| | | |
|---|---|---|
| JP | 2000-101502 | 4/2000 |
| JP | 2001-514811 | 9/2001 |
| JP | 2002-084261 | 3/2002 |
| JP | 2003-032207 | 1/2003 |
| JP | 2003-333012 | 11/2003 |
| RU | 2189113 | 9/2002 |
| WO | WO 99/03213 | 1/1999 |
| WO | WO 01/89102 | 11/2001 |
| WO | WO 02/091631 | 11/2002 |
| WO | WO 2004/100501 | 11/2004 |
| WO | WO 2005/101693 | 10/2005 |

OTHER PUBLICATIONS

Israfil Bahceci et al., Presentation: Diversity Comvining for Fading Channels, 13 pages, Nov. 23, 2004.
Michael W. Thelander, "WIMAX or WIBRO: Similar Names, Yet Dissimilar Technologies", Signal Resarch Group, Apr. 2006.
Kari Pietikainen, "Orthogonal Frequency Division Multiplexing", http://www.comlab.hut.fi/opetus/333/lectures.html, pp. 1-5, Feb. 22, 2005.
"Orthogonal Frequency-Division Multiplexing", http://en.wikipedia.org/w/index.php?title=Orthogonal_frequency-division_multiplexing&pri . . . , 7 pages, printed Jan. 3, 2006.
"806.16-E: IEEE Standard for Local and Metropolitan Area Networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1", IEEE Computer Society and IEEE Microwave Theory and Techniques Society, pp. iv-xxxix and 1-51, Feb. 28, 2006.
Internation Search Report issued in Application No. PCT/US08/057818 mailed Jun. 26, 2008.
Written Opinion issued in Application No. PCT/US08/057818 mailed Jun. 26, 2008.
Internation Search Report issued in Application No. PCT/US08/054985 mailed Jun. 27, 2008.
Written Opinion issued in Application No. PCT/US08/054985 mailed Jun. 27, 2008.
International Search Report issued in Application No. PCT/US06/025268 mailed Oct. 14, 2008.
Written Opinion issued in Application No. PCT/US06/025268 mailed Oct. 14, 2008.
International Preliminary Report on Patentability issued in Application No. PCT/US06/025268 mailed Dec. 11, 2008.
File History of U.S. Appl. No. 11/615,412.
File History of U.S. Appl. No. 12/508,942.
File History of U.S. Appl. No. 11/262,975.
File History of U.S. Appl. No. 12/037,475.
File History of U.S. Appl. No. 12/053,000.
Office Action issued in Russian Appl 2008131934 on Jun. 23, 2010.
English Translation of Office Action issued in Russian Appl 2008131934 on Jun. 23, 2010.
Response filed in Russian Appl 2008131934 to Office Action dated Jul. 23, 2010.
"Frequency Division Multiple Access" Definition; McGraw-Hill Dictionary of Scientific and Technical Terms; Sixth Edition; 2003; p. 854.
English Translation of Office Action issued in Chinese Application 200680050379 on Dec. 14, 2010.
Supplemental Search Report issued in EP 08744178 on Mar. 31, 2011.
English Translation of Office Action issued in Chinese Appl 200680024897.5 on May 25, 2011.
English Translation of Office Action issued in Chinese Appl 200680080379.0 on Jun. 22, 2011.
Li Shihe; TD-SCDMA Third Generation Mobile Communication System Standard; the People's Posts and Telecommunications Press; pp. 73 (Partial English Translation).
Li Fangwei; Mobile Communication Principle and System; the South West Normal University Press; pp. 10 (Partial English Translation).
Japanese Office Action issued in JP2008-549524 on Jul. 22, 2011.
English Language Translation of Japanese Office Action issued in JP2008-549524 on Jul. 22, 2011.
English Language Abstract of JP 2002-084261 published on Mar. 22, 2002.
English Language Translation of JP 2002-084261 published on Mar. 22, 2002.
English Language Abstract of JP 2003-032207 published Jan. 31, 2003.
English Language Translation of JP 2003-032207 published Jan. 31, 2003.
English Language Abstract of JP 2003-333012 published Nov. 21, 2003.
English Language Translation of JP 2003-333012 published Nov. 21, 2003.
Russian Office Action issued in 2009137370 on Oct. 19, 2011.
English Language Translation of Russian Office Action issued in 2009137370 on Oct. 19, 2011.
Japanese Office Action issued in JP 2008-549524 on Nov. 15, 2011.
English Language Translation of Japanese Office Action issued in JP 2008-549524 on Nov. 15, 2011.
Supplementary European Search Report issued in EP 06785792 on Dec. 13, 2011.

(56) References Cited

OTHER PUBLICATIONS

Russian Office Action issued in RU 2009139648 on Mar. 20, 2012.
English Language Translation of Russian Office Action issued in RU 2009139648 on Mar. 20, 2012.
Chinese Office Action issued in CN 200880010196.5 on Feb. 22, 2012.
English translation of Chinese Office Action issued in CN 200880010196.5 on Feb. 22, 2012.
Chinese Office Action issued in CN 200880004987.7 on Mar. 1, 2012.
English Language Translation of Chinese Office Action issued in CN 200880004987.7 on Mar. 1, 2012.
English Language Translation of Japanese Office Action issued in JP 2010-501035 on Mar. 21, 2012.
Decision of Grant issued in RU 2009-139648 on Jun. 26, 2012.
English Translation of Decision of Grant issued in RU 2009-139648 on Jun. 26, 2012.
English Language Abstract of RU 2189113 published Sep. 2, 2002.
Official Letter of Inquiry mailed in JP 2008-549524 on Aug. 21, 2012.
English Language Translation of the Official Letter of Inquiry mailed in JP 2008-549524 on Aug. 21, 2012.
English Language Abstract of JP 2001-514811 published Sep. 11, 2001.
English Language Translation of JP 2001-514811 published Sep. 11, 2001.
English Language Abstract of JP 10-075263 published Mar. 17, 1998.
English Language Translation of JP 10-075263 published Mar. 17, 1998.
English Language Abstract of JP 2000-101502 published Apr. 7, 2000.
English Language Translation of JP 2000-101502 published Apr. 7, 2000.
Chinese Office Action issued in CN 200880010196.5 on Nov. 8, 2012.
English Language Summary of Chinese Office Action issued in CN 200880010196.5 on Nov. 8, 2012.
English Language Translation of CN 200880004987.7 issued on Dec. 5, 2012.
Image File History of U.S. Appl. No. 13/437,626.
English language translation of Chinese Office Action issued in 200880004987.7 on Jun. 8, 2013.
Chinese Office Action issued in 200880010196.5 on Jul. 12, 2013.
Partial English language translation of Chinese Office Action issued in 200880010196.5 on Jul. 12, 2013.
English Language Translation of Chinese Office Action issued in CN 20088004987.7 dated Jan. 16, 2014.
Extended Search Report issued in EP 08730734.4 dated Jul. 28, 2014.
Satellite Earth stations and Systems (SES); Satellite-Digital Multimedia Broadcast system Service and Architecture; Draft ETSI TR 102 059, IEEE, LIS, Sophia Antipolis Cedex, France, No. V0.0.2, Dec. 2013.
File History of U.S. Appl. No. 13/437,626.
Office Action dated on Jan. 27, 2016 issued in related Indian Application 1784/MUMNP/2009.
Notice of Allowance dated Mar. 18, 2016 issued in corresponding European Application 06785792.0.

* cited by examiner

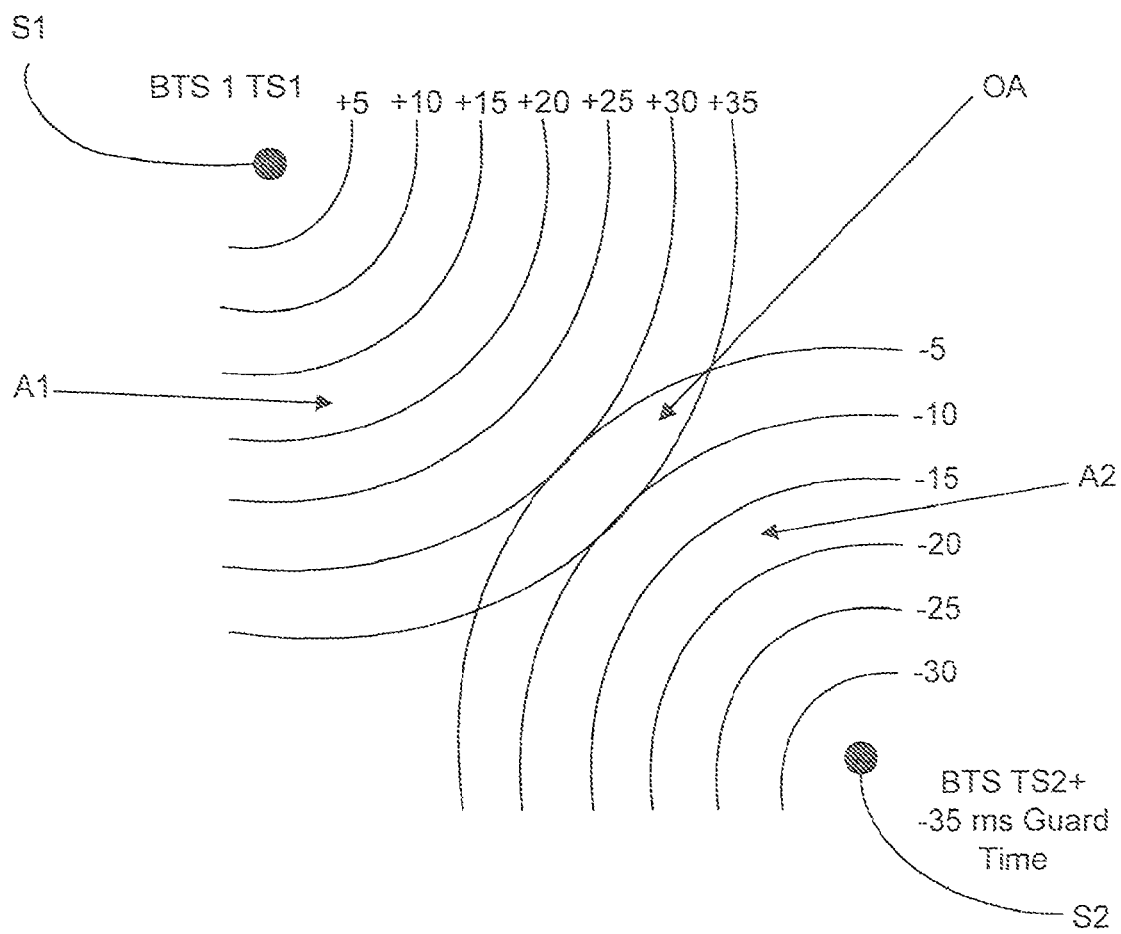

METHOD AND SYSTEM FOR MITIGATING CO-CHANNEL INTERFERENCE

CROSS-REFERENCE TO RELATED APPLICATION

This application is a divisional of U.S. patent application Ser. No. 12/508,942, filed on Jul. 24, 2009, which is a continuation of U.S. patent application Ser. No. 11/262,975, filed Nov. 1, 2005, which claims the benefit of the filing date of U.S. Provisional Patent Application No. 60/697,367, filed Jul. 8, 2005. The contents of all of these applications are incorporated herein by reference in their entirety.

FIELD OF THE INVENTION

The present invention relates generally to signal transmissions, and relates specifically to a method and transmission system for mitigating channel interference.

BRIEF SUMMARY OF THE INVENTION

An aspect of the present invention is to provide a method of communicating data between a first transceiver and any of a plurality of second transceivers, wherein areas serviced by each of the plurality of second transceivers either overlap or are adjacent. The method comprises operating the first transceiver and the plurality of second transceivers in an overlapping frequency range. Each of the plurality of second transceivers operates in a time period different from a time period of another of the plurality of second transceivers.

A further aspect of the present invention is to provide a method of transmitting identical data signals from a plurality of transmitters, wherein areas serviced by each of the plurality of transmitters either overlap or are adjacent. The method comprises operating the plurality of transmitters in an overlapping frequency range. Each of the plurality of transmitters operates in a time period different from a time period of another of the plurality of transmitters. The plurality of transmitters are configured to transmit identical data signals.

Another aspect of the present invention is to provide a system for communicating data signals in a network of transceivers. The system comprises a first transceiver and a plurality of second transceivers configured to communicate wirelessly with the first transceiver. The second transceivers are configured to service overlapping or adjacent areas, and each of the plurality of second transceivers is configured to operate in a time period different from a time period of another of the plurality of second transceivers. The first transceiver and the plurality of second transceivers operate in an overlapping frequency range, and the first transceiver is configured to communicate with any of the plurality of second transceivers.

Throughout this application, including the claims, the word "transceiver" is intended to mean a transmitter, a receiver or a combination transmitter/receiver.

BRIEF DESCRIPTION OF THE DRAWINGS

FIG. 3 shows an example where the start-stop of one time slot is offset by a guard time interval;

DESCRIPTION OF EMBODIMENTS OF THE INVENTION

Broadband or high speed wireless data systems generally require channels of large size in terms of carrier frequency occupancy. Modern radio-frequency (RF) broadband data systems usually require channel bandwidths of 5 to 30 MHz. However, other bandwidths are also used. In order to implement a broadband data system in contiguous geographical areas, a method or system to protect the contiguous geographical areas or other areas from possible signal overlap, which is one source of co-channel signal interference, may be needed. Signal spectrum in contiguous areas is generally not available in relatively large blocks of frequency. As a result, a single, relatively small spectral portion of the available bandwidth is allocated for each contiguous area in order to operate with minimal to free interference within the contiguous geographical areas. Of course the same problem exists for narrow band channels.

Figure 1:
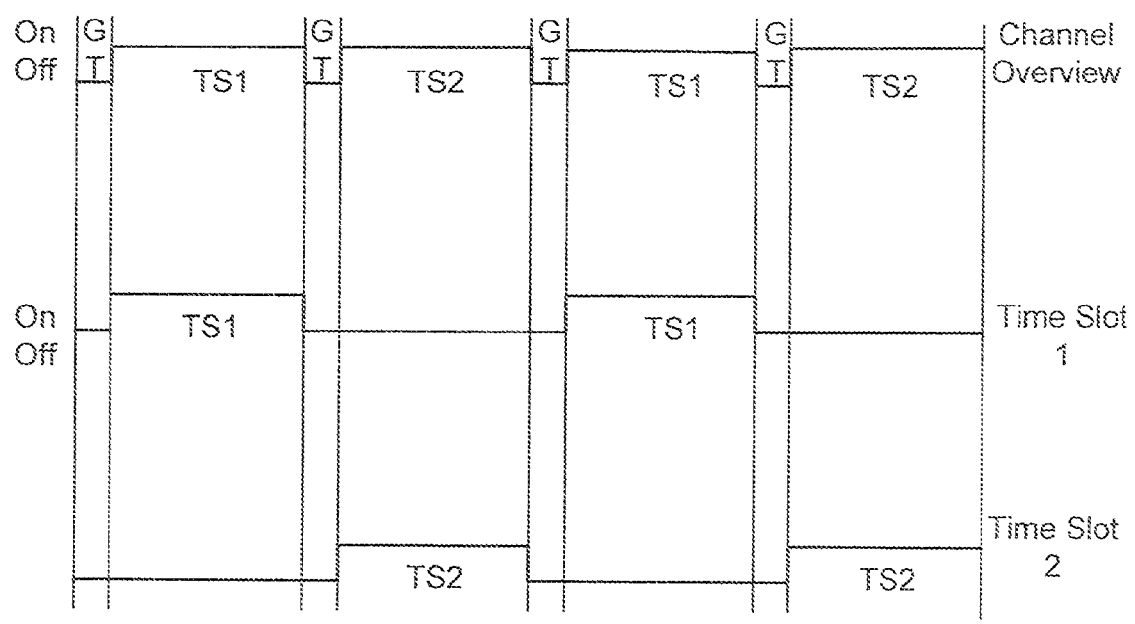
FIG. 1 shows a channel divided into two time slots, according to an embodiment of the invention.

An aspect of the present invention is to control interference by dividing a channel into time slots or time periods. In an embodiment of the invention, the channel is, for illustration purposes, divided into two time slots (or time periods) TS1 and TS2, as shown in FIG. 1. However, it must be appreciated that the channel may be divided into more than two time slots.

A relatively small time interval, referred to herein, as a guard time interval GT, is allocated between the two time slots TS1 and TS2. The two time slots TS1 and TS2 are illustrated in FIG. 1 as two signals in which each of two signals has a series of ON and OFF states. The two time slots TS1 and TS2 are shifted in time relative to each other such that, when TS1 is ON, TS2 is OFF, and vice-versa. A time interval in which TS1 or TS2 is ON is shorter than a time interval in which the corresponding signal is OFF. As a result, the combined channel signal (labeled in FIG. 1 as "channel overview"), which is a sum of TS1 and TS2, includes a series of ON states which correspond to the alternating ON states of TS1 and TS2. In addition, the combined channel signal also includes a series of OFF states which correspond to time intervals when both TS1 and TS2 are OFF. These time intervals correspond to the guard time interval GT.

The guard time interval GT can be determined by anticipated propagation distances (determined by the coverage of transmission sites), hardware switch-over time and needs of the particular network, such as tolerance of a user or network to delay and latency. The minimum guard time interval GT is determined by the hardware switch-over time and the maximum guard time interval is determined by the maximum propagation distance serviced or covered by each transmission site.

The guard time interval GT can be set so as to insure that there is substantially no overlap between the two time slots TS1 and TS2 at an edge of their respective coverage areas. In this example, the capacity of each time slot TS1 and TS2 (and by inference, each site using one of the two time slots) can be approximately 50% of the aggregate channel bandwidth. The capacity per time slot is slightly reduced from 50% due to the presence of the guard time interval GT between the time slots TS1 and TS2. The actual capacity loss associated with the guard time interval GT can be determined by the size of the guard time interval GT as a percentage of the time associated with the active time slots TS1 and TS2. Since the capacity per time slot is reduced proportionally to the number of time slots, the system can be implemented with the minimum number of time slots required to insure interference protection.

Figure 2:
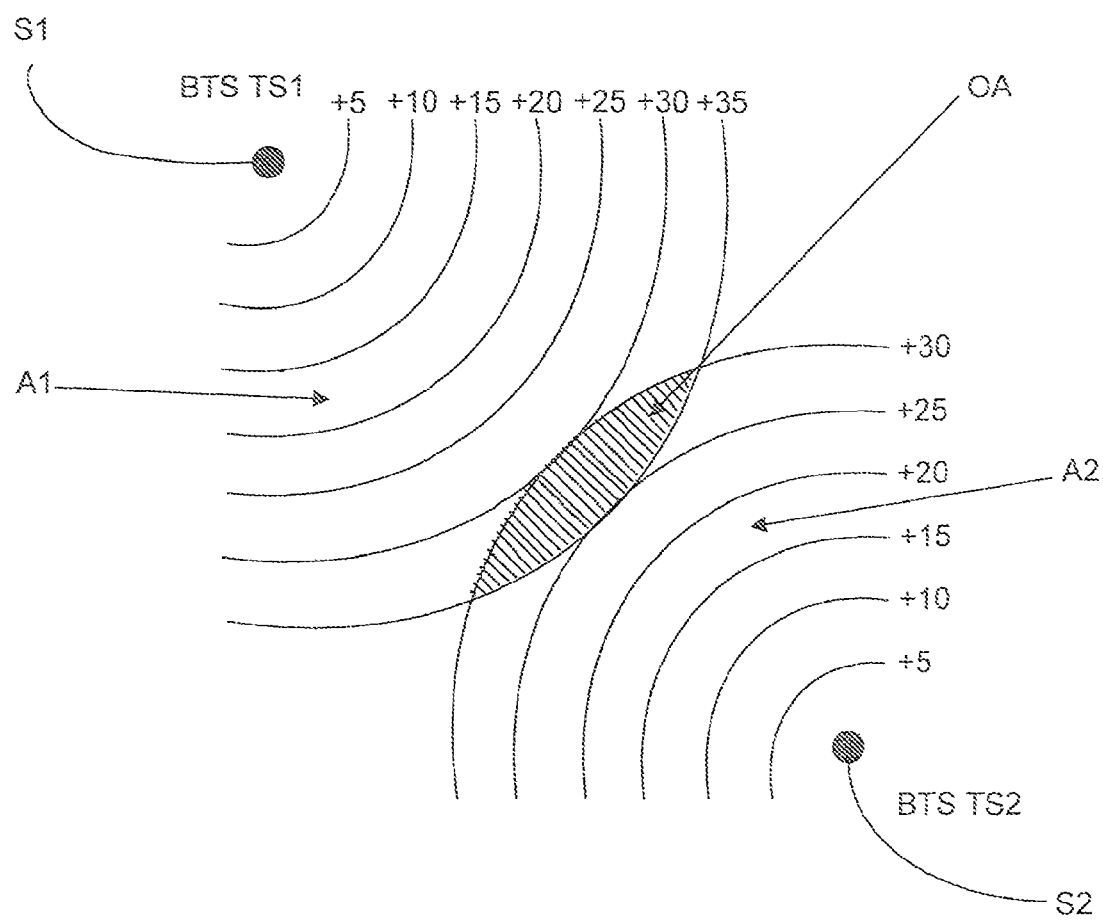
FIG. 2 illustrates an example where two areas that are covered by two different transmission sites S1 and S2 are overlapping.

FIG. 2 illustrates an example where two areas A1 and A2 that are covered or serviced by two different transmission sites S1 and S2 (for example, two Base Transmit Subsystems or BTS) are overlapping at area OA. The concentric circles around respective centers of sites S1 and S2 represent the propagation time of a signal which is directly proportional to the distance traveled by the signal. For example, in this embodiment, a one mile (approximately 1.6 kilometers) radius corresponds to a time interval equal to 5 ms. A user carrying a transceiver or customer premises equipment (CPE) in overlapping area OA receives signals simultaneously from multiple time slots, i.e., TS1 from S1 and TS2 from S2. Without an appropriate guard time interval between the time slots TS1 and TS2, the user will experience destructive interference which will lower the quality of the signal reception. In this example, if the guard time interval GT is less than 35 ms, both TS1 and TS2 exist at the same time in the overlap area OA leading to interference at the user's tranceiver.

When a guard time interval GT is reserved between the time slots TS1 and TS2, the time slots TS1 and TS2 do not overlap at the area OA where overlap is expected. FIG. 3 shows an example where the start-stop of time slot TS2 is offset by adding a guard time interval GT of −35 ms. By adding a guard time interval GT of −35 ms to the time slot TS2, the time intervals at respective distances from the center of site S2, i.e., the concentric circles around S2, show a negative time interval. Therefore, TS1 and TS2 are shifted from each other such that TS1 and TS2 do not exist at the same time, at the same location. As a result, interference between TS1 and TS2 is minimized or substantially reduced.

Figure 4A:
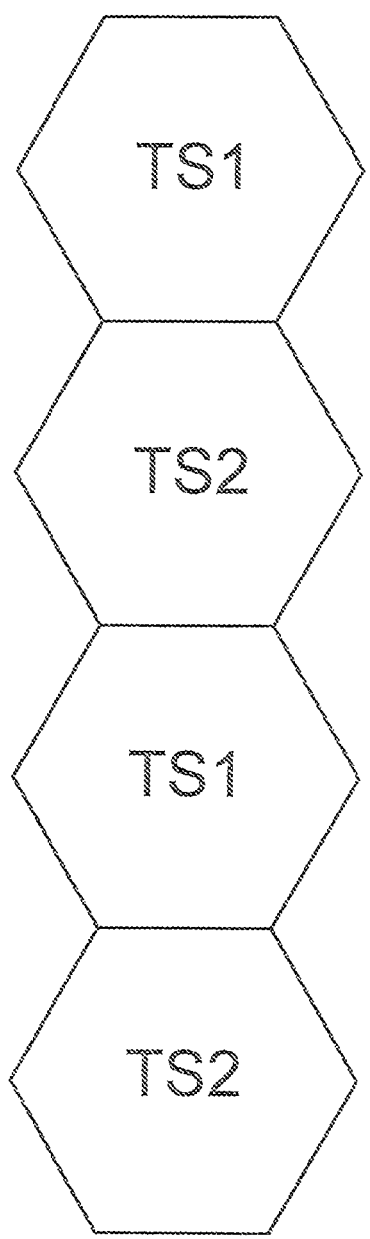
FIGS. 4A and 4B illustrate two configurations in a contiguous terrestrial coverage network according to two embodiments of the present invention.
Figure 4B:
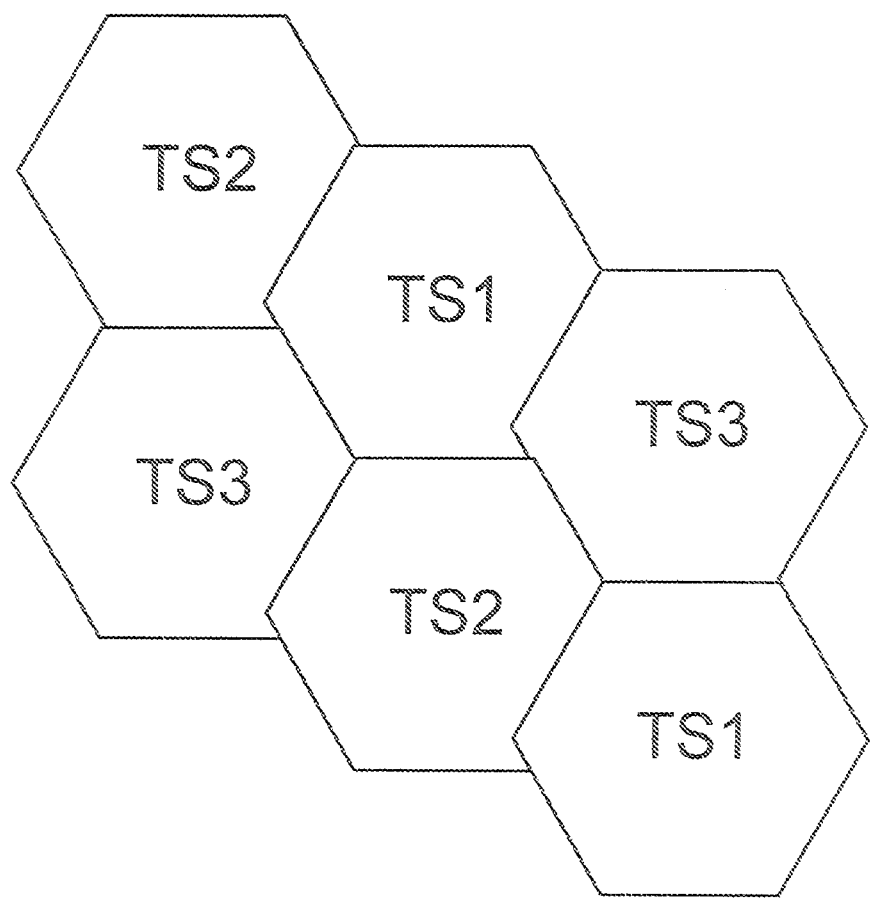

FIGS. 4A and 4B illustrate two configurations in a contiguous terrestrial coverage network according to two embodiments of the present invention. FIG. 4A shows a two time slot system that can be used for servicing or covering a linear area, for example, a highway or can be used in a high-site/low-site design where a high site is atop of a mountain or other prominent structure which would provide an "umbrella' coverage to a wide area, while lower elevation sites are interspersed within the umbrella coverage to fill coverage holes caused by local obstructions. In this case, the sub-areas or sites within the linear area, represented in the Figure by a hexagon, are serviced or covered alternatively by time slot TS1 and time slot TS2. In this way, overlap between two sub-areas or sites with a same time slot, for example TS1, can be prevented or minimized.

FIG. 4B shows a three time slot configuration that would be appropriate to cover a wide geographic area. In this case, a three time slot configuration is best suited for providing physical separation of all sites that utilize the same time slot. In this way, co-time slot overlap at site boundaries can be prevented or minimized. It must be appreciated that in each of these configurations, the site represented by a hexagon can be a unique physical site or can be an individual sector associated with a common geographical site location.

Figure 5:
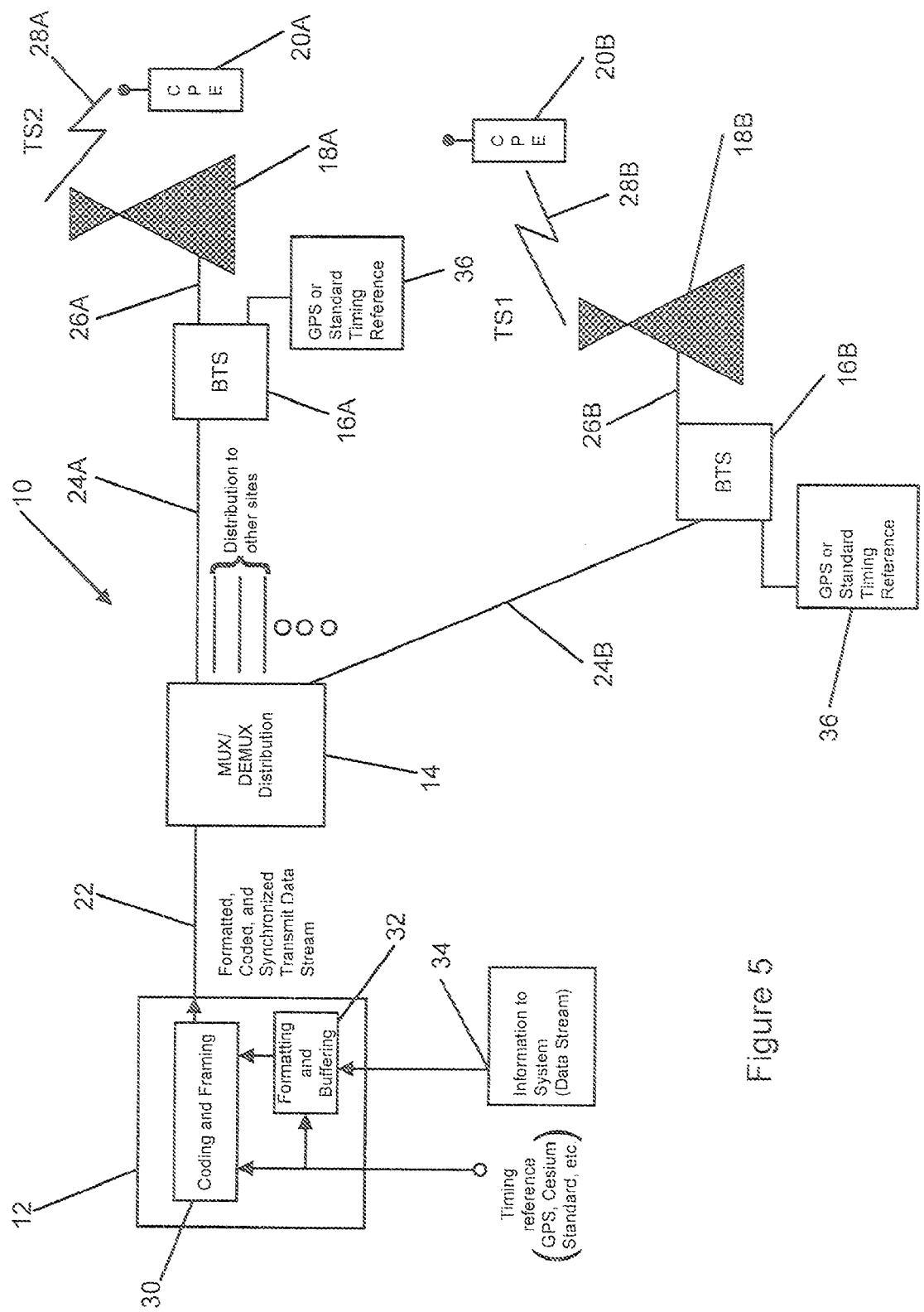
FIG. 5 illustrates a terrestrial based network system, according to an embodiment of the present invention.

FIG. 5 illustrates a terrestrial based network, according to an embodiment of the present invention. Throughout this application, including the claims, the word "transceiver" is intended to mean a transmitter, a receiver or a combination transmitter/receiver. The terrestrial network 10 comprises a control complex 12, multiplexer (MUX) and/or demultiplexer (DEMUX) distribution unit 14, individual base transmit subsystem (BTS) devices 16A and 16B, wireless transceivers 18A and 18B and transceivers (CPE) 20A and 20B. A terrestrial based network is used herein to mean that wireless transceivers 18A and 18B and transceivers 20A and 20B are all terrestrial based. The control complex 12 controls communication of transceiver 18A and 18B and transceivers 20A and 20B. Hence, transceivers 18A and 18B and transceivers 20A and 20B form a single network, i.e. terrestrial network 10. The control complex 12 and the MUX/DEMUX distribution unit 14 are linked via transmission line 22. The MUX/DEMUX distribution unit 14 distributes transmission signals to BTS devices 16A and 16B via, respectively, transmission lines 24A and 24B. BTS devices 16A and 16B are connected to transceivers 18A and 18B via connection lines 26A and 26B. The transceiver 18A transmits signals to transceiver 20A via transmission path 28A and the transceiver 18B transmits signals to transceiver 20B via transmission path 28B. Alternatively, the transceiver 18A receives signals from transceiver 20A via transmission path 28A and the transceiver 18B receives signals from transceiver 20B via transmission path 28B. Lines 22, 24A, 24B, 26A and 26B can be any kind of signal transport systems, for example, terrestrial digital carriers such as optical fibers and copper lines, microwave signal transmission, laser signal transmission, etc.

The control complex 12 comprises a signal coding and framing device 30 and a signal formatting and buffering device 32. Transmitted information data stream 34 is formatted and buffered with signal formatting and buffering device 32. The formatted and buffered data is further coded, synchronized and framed with coding and framing device 30 which transmits frames associated with generated time slots. The formatted, coded and synchronized data stream is then broken down into individual time slots and sent through transmission line 22 to be distributed using MUX/DEMUX distribution unit 14 to desired transceivers 18A and 18B via transmission lines 24A and 24B. At the BTS 16A and 16B the formatted, coded and synchronized data stream is referenced to a local timing source 36, for example, derived from the global positioning system (GPS) or derived from a cesium reference standard. The local timing reference 36 may be needed because the transport systems 22, 24A and 24B do not supply accurate enough timing and have to some extent variable latency and thus cannot in certain circumstances provide reliable timing to BTS 16A and 16B. Thus, each BTS 16A and 16B synchronizes incoming data stream with the external timing reference 36. Each BTS 16A and 16B provides sufficient buffering to insure synchronization with its neighboring sites. Each BTS 16A and 16B transmits a time slot based on the time slot it is assigned. Each transceiver CPE 20A and 20B monitors the signal and locks on and synchronizes with the strongest signal.

If the system is a simulcast network such as a single frequency simulcast network (SFSN) in which all time slots contain common information, each transceiver (e.g. receiver) CPE may monitor all time slots. In this case, the CPE (for example 20A) receives information from multiple transmitters or transmitting sites (18A and 18B) on multiple time slots (TS1 and TS2). In other words, the receiver 20A "listens" to all time slots TS1 and TS2 and captures the time slot with the best signal at any point in space. For example, if the receiver 20A is located at an edge of coverage of multiple sites (18A and 18B), the receiver 20A has the opportunity to receive and integrate an identical content stream from multiple transmission sources 18A and 18B. This increases the likelihood of accurately receiving content in areas that are near an edge of reliable coverage or that are locally shadowed by physical obstructions from a desired transmission site (for example transmitter 18A). Hence, the receiver (CPE) 20A would be able to recover transmitted information from transmitter 18A.

If the system is a non-simulcast system, CPEs 20A and 20B are involved in different communications. In the case where each transceiver 18A and 18B acts as transmitter and each CPE acts as a receiver, the CPE (receiver) 20A can monitor only the time slot of the strongest transmitter (for example 18A) to which it is locked and synchronized because desired content being provided to the CPE 20A is transmitted only by the transmitter 18A in the associated time slot. As CPE 20A moves around the network system, communication for CPE 20A will eventually need to pass onto another transmitter (for example transmitter 18B) as the transmitter 18B becomes a better communication path to the CPE 20A. This is accomplished by having both the CPE and BTS monitor the received signal strength (RSSI) of their respective signals. When RSSI or signal quality falls below a predetermined threshold, the CPE or BTS attempts to identify a better serving site to continue the communication.

When a communication is established between BTS 16A and CPE 20A, if the BTS 16A notes that RSSI has fallen below threshold, the system 10 initiates a scan in all neighboring sites (for example BTS 16B and other sites). The scan tunes a receiver BTS 16B or adjacent BTSs to the time slot that CPE 20A and BTS 16A are communicating with, and records the RSSI received. If a neighbor site BTS 16B reports back better RSSI, the system 10 shifts the communication to the new site BTS 16B by coordinating a change in routing from BTS 16A to BTS 16B, and commands the CPE 20A to shift to the time slot assigned to the new site BTS 16B. If the CPE 20A identifies that the signal it receives has fallen below the predetermined RSSI threshold, it can send a message to the system 10, which initiates the previous routine, and/or can itself begin monitoring additional time slots in an attempt to identify a better serving BTS. If the CPE 20A identifies a better serving BTS (for example BTS 16B), it sends a message to the system 10 (using overhead in the channel dedicated to CPE control) identifying the improved BTS 16B. The system then coordinates the shift of the CPE 20A to the new BTS 16B in the same manner described previously.

In the case where each transceiver 18A and 18B acts as a receiver and the CPEs act as transmitters, each transceiver (receiver) 18A and 18B monitors data signal strength of a received data signal from the transmitter CPE (for example 20A). Receiver 18A compares the data signal strength of the received data signal from transmitter 20A to strength of signal (s) received by other receiver 18B, and receiver 18B compares the data signal strength of the received data signal from transmitter 20A to the strength of signals received by other receiver 18A. The receiver among receivers 18A and 18B receiving the strongest data signal from transmitter CPE 20A takes on communication with the transmitter CPE 20A. This can be accomplished with a dedicated scanning receiver which monitors activity on time slots assigned to other sites, or by using any available receiver to listen to system activity on time slots other than the slot assigned to the BTS for providing communication. These approaches allow for constant feedback on the RSSI and quality seen by each BTS. When the RSSI of a CPE seen by this scan exceeds a certain predetermined threshold, a notification is sent to the system. This notification begins a routine similar to that explained above, where the CPE and neighboring BTS or BTSs identify the new best serving BTS and coordinate a transition of the communication to the new BTS. As a result, in this case also, the communication with a CPE transmitter can be transitioned to other receivers as required to provide a best service to the CPE.

A satellite system with a terrestrial coverage feature is also contemplated herein. In this case, the system can be timed to include an offset equal to a propagation delay from a satellite to the surface of earth in the coverage area. This can be accomplished by using the arriving satellite signal to synchronize and time the terrestrial transceiver sites.

Figure 6:
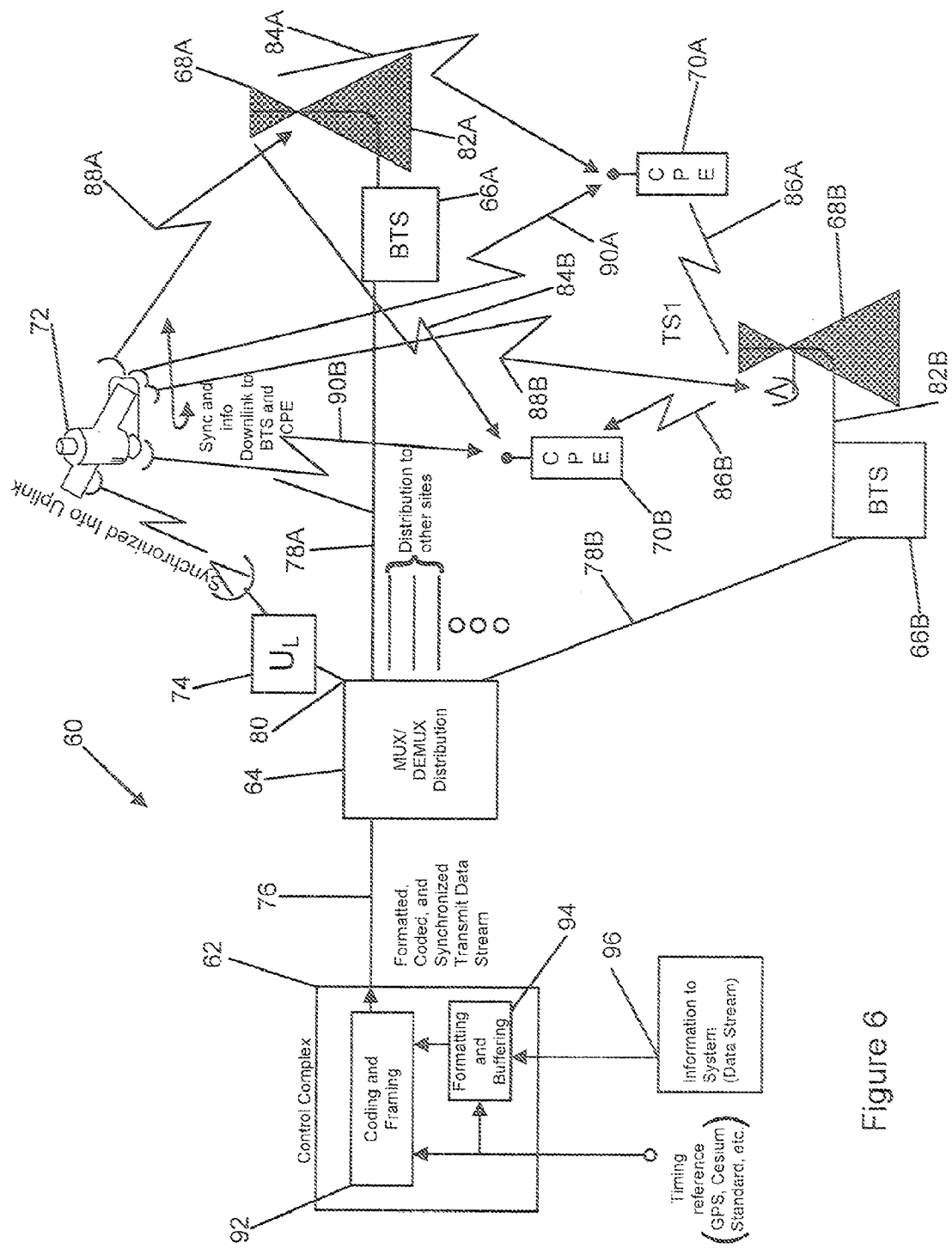
FIG. 6 illustrates a network system that combines coverage from both satellite and terrestrial elements, according to another embodiment of the present invention.

FIG. 6 illustrates a network system that combines coverage from both satellite and terrestrial elements, according to an embodiment of the present invention. In this case, a CPE is capable of receiving or transmitting both a satellite signal and a terrestrial wireless signal. The combined satellite-terrestrial network 60 comprises a signal processor control complex 62, multiplexer (MUX) and/or demultiplexer (DEMUX) distribution unit 64, individual base transmit subsystem (BTS) devices 66A and 66B, transceivers 68A and 68B and transceivers 70A and 70B. The combined satellite-terrestrial network further comprises satellite 72 and uplink system (UL) 74. The control complex 62 controls communication of transceiver 68A and 68B, transceivers 70A and 70B and satellite 72. Hence, transceivers 68A and 68B, transceivers 70A and 70B and satellite 72 form a single network, i.e. combined satellite-terrestrial network 60. The control complex 62 and the MUX/DEMUX distribution unit 64 are linked via transmission line 76. The MUX/DEMUX distribution unit 64 distributes transmission signals to BTS devices 66A, 66B and uplink system UL 74 via, respectively, transmission lines 78A, 78B and 80. BTS devices 66A and 66B are connected to transceivers 68A and 68B via connection lines 82A and 82B. The transceiver 68A is able to communicate with transceiver CPE 70A via transmission path 84A and is able to communicate with transceiver CPE 70B via transmission path 84B. Similarly, the transceiver 68B is able to communicate with transceiver CPE 70A via transmission path 86A and is able to communicate with receiver 70B via transmission path 86B.

The MUX/DEMUX distribution unit 64 further distributes, signals to uplink 74 which sends the signal to satellite 72. The satellite 72 is capable of sending signals to transceivers 68A and 68B via transmission paths 88A and 88B, respectively. The satellite is also capable of sending signals to transceivers CPE 70A and CPE 70B via transmission paths 90A and 90B, respectively. Lines 76, 78A, 78B, 80, 82A and 82B can be any kind of signal transport systems, for example, terrestrial digital carriers such as optical fibers and copper lines, microwave signal transmission, laser signal transmission, etc.

Similarly to the embodiment depicted in FIG. 5, the signal processor control complex 62 comprises a signal coding and framing device 92 and a signal formatting and buffering device 94. Transmitted information stream 96 is formatted and buffered with signal formatting and buffering device 94. The formatted and buffered data is further coded and framed with coding and framing device 92 which transmits frames associated with generated time slots. The formatted, coded and synchronized data stream is then broken down into individual time slots is sent through transmission line 76 to be distributed using MUX/DEMUX distribution unit 64 to desired transceivers 82A and 82B via transmission lines 78A and 78B and sent to uplink system 74 via communication line 80 for further transmission to satellite 72.

CPE 70A can receive signals from and/or send signals to both satellite 72 and transceiver 68A. Similarly, CPE 70B can receive signals from and/or send signals to both satellite 72 and transceiver 68B. BTS 66A, 66B and CPE 70A, 70B are synchronized to signal processor control complex 62 via a timing reference provided by satellite. The synchronization is performed either directly by satellite 72 to CPE 70A and 70B or by satellite 72 to CPE 70A and 70B via BTS 66A and 66B, respectively. In other words, the network system 60 timing is delivered to the satellite 72 and each BTS 66A and 66B receives a signal from the satellite 72 which the BTS 66A and 66B use as a timing reference. This insures accurate time slot allocation and guard time generation by insuring that propagation delay of the signal from the satellite 72 to ground is locally accommodated by the terrestrial network of BTSs (for example, BTS 66A, BTS 66B etc.). In this case, the satellite 72 is assigned one time slot TS while remaining time slots are assigned to the terrestrial network of BTS devices/stations (BTS 66A and BTS 66B etc.). The satellite 72 transmits during its assigned time slot and each BTS station 66A and 66B synchronize to this time slot and generate its time slot start time based on the satellite 72 delivered time slot. This insures that all BTSs 66A and 66B are accurately timed based on the propagation time delay from the satellite 72 to the ground.

The BTS 66A and 66B and CPE 70A and 70B operate in a similar way as in the embodiment depicted in FIG. 5. However, in this embodiment, CPEs 70A and 70B can be served uniquely by a time slot delivered by satellite 72 if there is no available terrestrial BTS to serve the CPEs 70A and 70B.

In the case where each BTS 66A and BTS 66B signals are transmitted via transceivers 68A and 68B which act as transmitters and the CPEs 70A and 70B act as receivers, the receiver (for example, CPE 70A) will look for both a signal from satellite 72 and signals from BTS 66A and 66B transmitted by transmitters 68A and 68B and lock onto whichever signal is found to provide the strongest or highest quality signal. In a similar way as in the embodiment depicted in FIG. 5, there is an expectation that communications will take place while a CPE (for example CPE 70A) is transiting the system 60. The system 60 is able to "hand-over" communications from BTS to BTS, or BTS to satellite, or satellite to BTS as the CPE 70A moves. The satellite, CPE, and BTS monitor a received signal strength (RSSI) of their respective signals. If, for example, a communication is established between CPE 70A and BTS 66A, when RSSI or signal quality falls below a predetermined threshold, the CPE 70A or satellite or BTS 66A will attempt to identify a better serving site to continue the communication. If the BTS 66A notes that RSSI has fallen below threshold, the system 60 initiates a scan in all neighboring sites (BTS 66B and other sites) as well as the satellite. The scan tunes a receiver (BTS 66B) to the time slot that the CPE 70A and BTS 66A are communicating with and to CPE 70A, and records the RSSI received. If a neighbor site (BTS 66B or other site) or the satellite reports back better RSSI, the system shifts the communication to the new site (for example BTS 66B) or the satellite by coordinating the change in routing from BTS 66A to BTS 66B or from BTS 66A to the satellite, and commands the CPE 70A to shift to the time slot assigned to the new site (BTS 66B or the satellite). If the CPE 70A identifies that it has fallen below the predetermined RSSI threshold, it can send a message to the system 60, which initiates the previous routine, and/or can itself begin monitoring additional time slots in an attempt to identify a better serving BTS. If the CPE 70A identifies a better serving BTS, it sends a message to the system 60 (using overhead in the channel dedicated to CPE control) identifying the improved BTS. The system then coordinates the shift of the CPE 70A to the new BTS (for example BTS 66B) or to the satellite in the same manner described previously. In other words, the receiver "listens" to all time slots and attempts to utilize the time slot with the strongest or best signal at any point in space.

In the case where each transceiver 68A and 68B and satellite 72 act as a receiver and each CPE 70A and 70B act as a transmitter, each receiver 68A and 68B (or its associated BTS 66A and 66B) and satellite 72 monitors signal strength of a received signal from the transmitter CPE (for example 70A). Satellite 72 and receiver 68A compares the data signal strength of the received data signal from transmitter 70A to strength of signal(s) received by remaining receiver 68B and receiver 68B compares the data signal strength of the received data signal from transmitter 70A to strength of signals received by receiver 68A and satellite 72. All signal and quality information from all receivers is reported to the system control center 62, where it coordinates the assignment of time slots to the CPE and the system which best serves the CPE. The receiver among satellite 72, and receivers 68A and 68B receiving the strongest data signal from transmitter CPE 70A takes on communication with the transmitter CPE 70A. As a result, the highest quality signal available in the network is always provided to the CPE.

In the case of a simulcast network, the CPE (for example, CPE 70A) "listens" to the satellite time slot while simultaneously "listening" for terrestrial BTS time slots. In an embodiment of the invention, the CPE recovers data from the time slot providing the lowest error rate. In another embodiment, the CPE combines subframes from all received time slots in order to best recreate the original signal in cases where none of the time slots provides an error free recovery. For example, if the CPE is located at an edge of coverage of multiple sites, the CPE has the opportunity to receive and integrate an identical content stream from multiple transmission sources. This increases the likelihood of accurately receiving content in areas that are near an edge of reliable coverage or that are locally shadowed by physical obstructions from a desired transmission site.

Figure 7A:
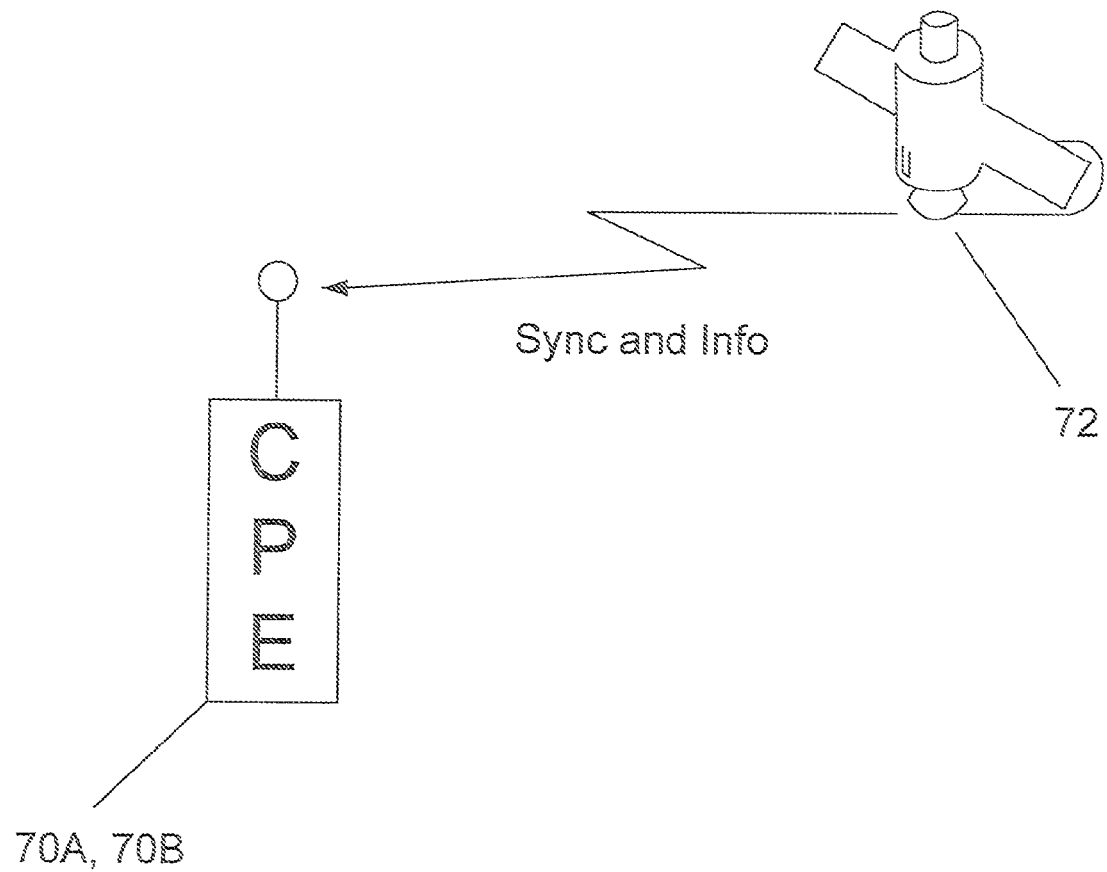
FIGS. 7A, 7B and 7C show how the synchronization is derived from multiple network elements, according to various embodiments of the present invention.
Figure 7B:
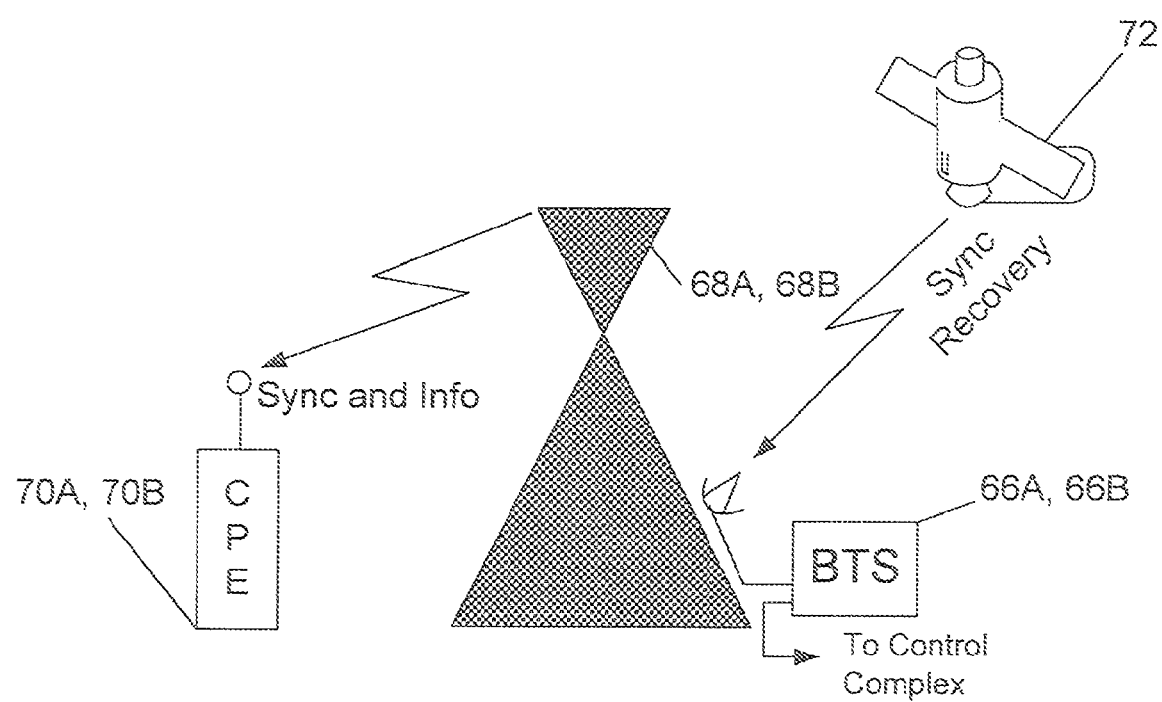
Figure 7C:
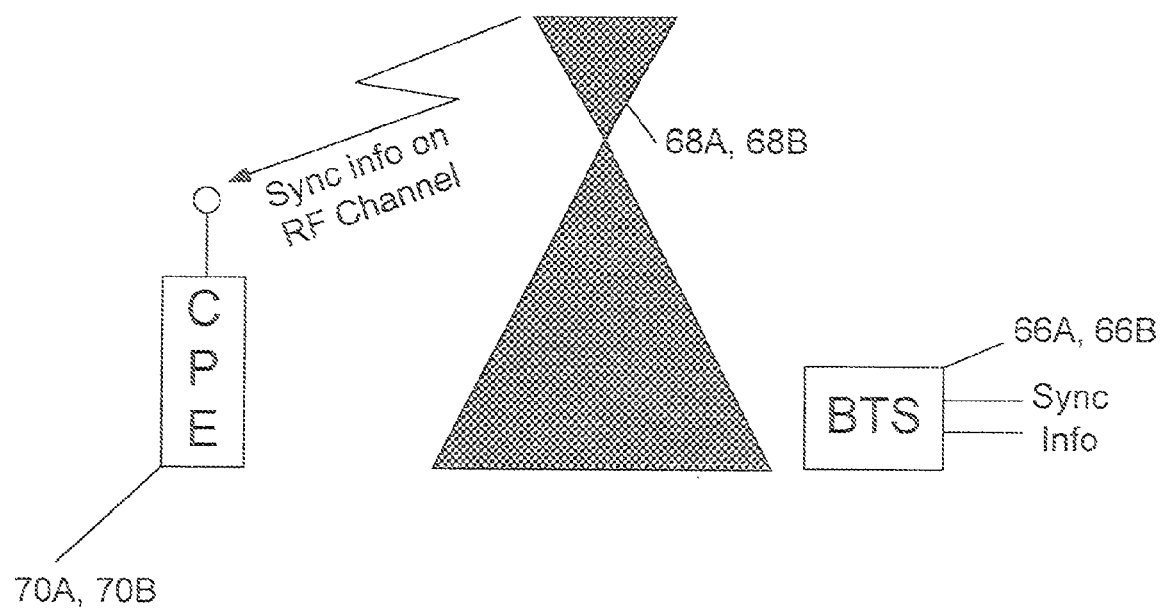

FIGS. 7A, 7B and 7C show how the CPE derives its synchronization from multiple network elements. A CPE 70A, 70B is synchronized to signal processor control complex 62 (shown in FIG. 6) via timing reference provided by satellite 72 either directly by satellite 72 to CPE 70A, 70B (as shown in FIG. 7A), provided by satellite 72 to CPE 70A, 70B via BTS 66A, 66B (as shown in FIG. 7B), or by timing using BTS 66A, 66B synchronization signal based upon a standard timing reference or GPS reference input.

Although the network system is described herein in a configuration using two transceivers (receivers) and two transceivers (transmitters), it must be appreciated that one or more transceivers (receivers) and one or more transceivers (transmitters) is also contemplated herein and hence falls within the scope of the present invention.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the method and apparatus of the present invention, like related apparatus and methods used in the telecommunication arts are complex in nature, are often best practiced by empirically determining the appropriate values of the operating parameters, or by conducting computer simulations to arrive at best design for a given application. Accordingly, all suitable modifications, combinations and equivalents should be considered as falling within the spirit and scope of the invention.

In addition, it should be understood that the figures, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. A method of transmitting identical data signals from a plurality of transmitters, wherein areas serviced by each of said plurality of transmitters either overlap or are adjacent, comprising:
   operating said plurality of transmitters to transmit identical data signals on a single channel to a receiver in an overlapping frequency range, wherein each of said plurality of transmitters operates to transmit the identical data signals to the receiver in a time period different from a time period in which another of said plurality of transmitters operates to transmit the identical data signals to the receiver.

2. The method according to claim 1, wherein the time period during which each of said plurality transmitters operates and the time period during which another of said plurality of transmitters operates are separated by a guard time interval during which neither one operates.

3. The method according to claim 2, wherein the guard time interval comprises a maximum guard time interval corresponding to a maximum time delay a data signal takes to propagate a distance between each of the plurality of transmitters to corresponding serviced areas and a minimum guard time interval corresponding to hardware switch over time.

4. The method according to claim 1, wherein said guard time interval is selected so that there is substantially no overlap between the time period during which each of said plurality of transmitters operates and the time period during which another of said plurality of transmitters operates.

5. The method according to claim 1, further comprising operating a receiver in the overlapping frequency range, wherein the receiver monitors data signal strength of a received data signal from one of said plurality of transmitters and compares the data signal strength of the received data signal to strength of data signals received from surrounding areas serviced by remaining transmitters in said plurality of second transceivers.

6. The method according to claim 5, wherein the receiver locks on a strongest data signal.

7. The method according to claim 5, wherein the receiver integrates the identical data signals transmitted by each of the plurality of transmitters.

8. The method according to claim 5, wherein one of said plurality of transmitters is a satellite and said receiver is configured to receive a data signal from said satellite and to receive data signals from remaining transmitters in said plurality of transmitters.

9. The method according to claim 8, wherein said remaining transmitters are terrestrial and are configured to receive the data signal from said satellite.

10. The method according to claim 8, wherein the satellite is assigned a time period and the remaining transmitters are assigned remaining time periods.

11. The method according to claim 10, wherein each of the remaining transmitters synchronizes to the time period assigned to the satellite and generates its time period start time.

12. The method according to claim 8, wherein the remaining transmitters are timed based upon a signal propagation time delay from the satellite to the ground.

13. The method according to claim 8 wherein the receiver locks on a strongest data signal among signals transmitted by the satellite and the remaining transmitters.

14. The method according to claim 8, wherein the receiver integrates identical data signals received from the satellite and each of the remaining transmitters in the plurality of second transmitters.

15. The method according to claim 1, wherein at least two transmitters in said plurality of second transmitters are terrestrial.

16. The method according to claim 1, wherein said plurality of second transmitters are terrestrial.

17. The method according to claim 1, wherein said plurality of second transmitters are controlled by a same control complex.

18. A terrestrial-based device for communicating data signals in a network, comprising:
   a terrestrial-based transceiver configured to wirelessly communicate with one or more base stations and/or satellites from a plurality of base stations and/or satellites that are configured to wirelessly service overlapping or adjacent areas, each base station and/or satellite being configured to operate in a time period different from a time period of another base station and/or satellite,
   wherein the terrestrial-based transceiver is configured to communicate with a base station or satellite from the plurality of base stations and/or satellites during the time period in which that base station or satellite operates,
   wherein the terrestrial-based transceiver communicates data signals with the one or more base stations and/or satellites in an overlapping frequency range.

19. The terrestrial-based device of claim 18, wherein a time period at which a base station or satellite from the plurality of base stations and/or satellites operates is unique and separated from an adjacent time period at which another base station or satellite from the plurality of base stations and/or satellites operates by a guard time interval during which no base station or satellite operates.

20. A terrestrial-based device for communicating data signals in a network, comprising:
   a terrestrial-based transceiver configured to wirelessly communicate with one or more base stations and/or satellites from a plurality of base stations and/or satellites that are configured to wirelessly service overlapping or adjacent areas, each base station and/or satellite being configured to operate in a time period different from a time period of another base station and/or satellite, the terrestrial-based transceiver being configured to operate in an overlapping frequency range with the plurality of base stations and/or satellites,
   wherein each time period is separated from an adjacent time period by a guard time interval during which no base station or satellite operates, the guard time interval having a maximum duration corresponding to a maximum time delay a signal takes to propagate a distance between each base station and/or satellite to associated serviced areas and a minimum duration corresponding to hardware switch-over time, and wherein the terrestrial-based transceiver is configured to monitor signal strength of a received data signal from one of the base stations and/or satellites and compares the signal strength of the received data signal to strength of data signals received from surrounding areas serviced by remaining base stations and/or satellites from the plurality of base stations and/or satellites and selects the base station or satellite with the strongest signal for communication.

21. A system for communicating data signals in a network, comprising:

a base station configured to wirelessly communicate with a terrestrial-based device, the base station being one of a plurality of base stations and/or satellites configured to wirelessly service overlapping or adjacent areas, the base station being configured to operate in a time period different from a time period of another base station and/or satellite from the plurality of base stations and/or satellites, the base station being configured to operate in an overlapping frequency range with the terrestrial-based device, wherein the time period at which the base station operates is separated from an adjacent time period associated with another base station and/or satellite from the plurality of base stations and/or satellites by a guard time interval during which neither the base station nor another base station and/or satellite operates, the guard time interval having a maximum duration corresponding to a maximum time delay a signal takes to propagate a distance between each base station and/or satellite from the plurality of base stations and/or satellites to associated serviced areas and a minimum duration corresponding to hardware switch-over time, wherein the base station is configured to monitor data signal strength of a received data signal from the terrestrial-based device and to compare the data signal strength of the received data signal to strength of signals received by remaining base stations and/or satellites from the plurality of base stations and/or satellites from said terrestrial-based device, and wherein the base station is configured to take on communication with the terrestrial-based device when the base station is the base station and/or satellite that receives the strongest data signal from the terrestrial-based device.

* * * * *